United States Patent
Huang

(10) Patent No.: US 8,396,649 B2
(45) Date of Patent: Mar. 12, 2013

(54) METHOD AND APPARATUS FOR RECONSTRUCTING IN-CYLINDER PRESSURE AND CORRECTING FOR SIGNAL DECAY

(75) Inventor: Jian Huang, Richmond (CA)

(73) Assignee: Westport Power Inc., Vancouver, British Columbia (CA)

( * ) Notice: Subject to any disclaimer, the term of this patent is extended or adjusted under 35 U.S.C. 154(b) by 0 days.

(21) Appl. No.: 13/360,519

(22) Filed: Jan. 27, 2012

(65) Prior Publication Data

US 2012/0150414 A1    Jun. 14, 2012

Related U.S. Application Data

(63) Continuation of application No. PCT/CA2010/001143, filed on Jul. 27, 2010.

(51) Int. Cl.
*G06G 7/70*    (2006.01)
*G06F 19/00*    (2011.01)
*G01M 15/08*    (2006.01)
*G01L 27/00*    (2006.01)

(52) U.S. Cl. ........ 701/111; 701/101; 701/102; 701/103; 701/104; 701/105; 701/110; 123/406.27; 702/98; 702/102; 702/182; 702/183; 702/185; 73/35.03; 73/35.04; 73/35.12; 73/114.16

(58) Field of Classification Search .................. 123/435, 123/568.16, 406.17, 406.22, 406.41, 406.27; 702/104, 98, 90, 182, 183, 185; 701/101, 701/102, 103, 104, 105, 106, 108, 110, 111, 701/114, 115; 73/35.01, 35.03, 35.04, 35.05, 73/35.12, 114.16, 114.17, 114.18, 114.19

See application file for complete search history.

(56) References Cited

U.S. PATENT DOCUMENTS

| | | | | |
|---|---|---|---|---|
| 4,312,214 A | * | 1/1982 | Kramer et al. | 73/35.05 |
| 4,637,245 A | * | 1/1987 | Iwata et al. | 73/35.03 |
| 5,739,417 A | * | 4/1998 | Grob et al. | 73/35.03 |
| 6,273,064 B1 | * | 8/2001 | Scholl et al. | 123/406.24 |

(Continued)

FOREIGN PATENT DOCUMENTS

| FR | 2862089 | 5/2005 |
|---|---|---|
| FR | 2862089 A1 | 5/2005 |

(Continued)

OTHER PUBLICATIONS

Int'l Search Report for PCT/SE01/02039 mailed Jan. 10, 2002.

(Continued)

*Primary Examiner* — Stephen K Cronin
*Assistant Examiner* — Raza Najmuddin
(74) *Attorney, Agent, or Firm* — Corridor Law Group, P.C.

(57) ABSTRACT

A method comprises steps for reconstructing in-cylinder pressure data from a vibration signal collected from a vibration sensor mounted on an engine component where it can generate a signal with a high signal-to-noise ratio, and correcting the vibration signal for errors introduced by vibration signal charge decay and sensor sensitivity. The correction factors are determined as a function of estimated motoring pressure and the measured vibration signal itself with each of these being associated with the same engine cycle. Accordingly, the method corrects for charge decay and changes in sensor sensitivity responsive to different engine conditions to allow greater accuracy in the reconstructed in-cylinder pressure data. An apparatus is also disclosed for practicing the disclosed method, comprising a vibration sensor, a data acquisition unit for receiving the vibration signal, a computer processing unit for processing the acquired signal and a controller for controlling the engine operation based on the reconstructed in-cylinder pressure.

40 Claims, 6 Drawing Sheets

U.S. PATENT DOCUMENTS

| | | |
|---|---|---|
| 6,397,669 B1 | 6/2002 | Raichle et al. |
| 7,133,761 B2 * | 11/2006 | Ancimer ............... 701/103 |
| 7,200,487 B2 * | 4/2007 | Ancimer ............... 701/111 |
| 7,444,231 B2 | 10/2008 | Ancimer et al. |
| 2004/0236494 A1 | 11/2004 | DeBotton et al. |
| 2004/0267430 A1 | 12/2004 | Ancimer |
| 2007/0038392 A1 * | 2/2007 | Iyer et al. ............... 702/56 |
| 2008/0051975 A1 | 2/2008 | Ker et al. |
| 2008/0053405 A1 | 3/2008 | Vigild et al. |
| 2009/0030593 A1 | 1/2009 | Chauvin et al. |

FOREIGN PATENT DOCUMENTS

| | | |
|---|---|---|
| WO | 0225237 A1 | 3/2002 |
| WO | WO 02/25237 | 3/2002 |

OTHER PUBLICATIONS

International Preliminary Report on Patentability issued on Jan. 31, 2002, for PCT/CA2010/001143.

International Search Report and Written Opinion issued on Jan. 10, 2002, for PCT/CA2010/001143.

* cited by examiner

METHOD AND APPARATUS FOR RECONSTRUCTING IN-CYLINDER PRESSURE AND CORRECTING FOR SIGNAL DECAY

CROSS-REFERENCE TO RELATED APPLICATION(S)

This application is a continuation of International Application No. PCT/CA2010/001143, having an international filing date of Jul. 27, 2010, entitled "Method And Apparatus For Reconstructing In-Cylinder Pressure And Correcting For Signal Decay". The '143 international application claimed priority benefits, in turn, from Canadian Patent Application No. 2,673,216 filed Jul. 31, 2009. The '143 international application is hereby incorporated by reference herein in its entirety.

STATEMENT REGARDING FEDERALLY SPONSORED RESEARCH

This invention was made with Government support under Contract No. DE-FC26-06NT42967 awarded by the United States Department of Energy. The Government has certain rights in the invention.

FIELD OF THE INVENTION

The present invention relates to a method and apparatus for internal combustion engines that involves reconstructing in-cylinder pressure from a vibration signal and correcting for signal decay to improve the accuracy of the reconstructed data. The vibration sensor which captures the vibration signal is deflected by changes in the engine's in-cylinder pressure and the disclosed method corrects the generated data and reconstructs an in-cylinder pressure curve for at least a portion of the engine cycle of the internal combustion engine. The in-cylinder pressure thus obtained can be used to control engine operation for improving combustion efficiency and engine performance.

BACKGROUND OF THE INVENTION

In operating an internal combustion engine, combustion data relating to normal combustion characteristics such as the timing for start of combustion ("SOC") and the combustion rate, which can be derived from the heat release rate and the in-cylinder pressure, are combustion characteristics that can be used to improve the combustion quality, increase engine efficiency and reduce undesirable combustion products, such as soot (also known as particulate matter), unburned fuel, NOx and greenhouse gases. More accurate combustion data relating to at least one of these combustion characteristics is desirable to improve engine operation. Known instrumentation for measuring combustion data include: pressure transducers that employ sensors disposed in the combustion chamber to measure in-cylinder pressure; emissions sensors that can be located in the exhaust ports or exhaust manifold; and temperature sensors located in the combustion chamber or in an exhaust port. Such instrumentation can be used to collect data that can be correlated with combustion characteristics or combustion data directly. However, it can be impractical to employ such instrumentation in a mass produced engine, because in addition to being intrusive and/or being subjected to a harsh environment in the location where they are installed, such sensors can also be expensive and lack the durability needed for reliable and prolonged everyday use.

Vibration sensors, such as for example accelerometers, are sold commercially for use as knock sensors for detecting engine knock. Engine knock is considered an abnormal combustion characteristic because it does not occur when the engine is operating normally. Engine knock correlates to violent combustion events that can be caused by pre-mature and uncontrolled detonation of the charge inside the combustion chamber, caused, for example, if an Otto-Cycle engine has been fuelled with a fuel that has an octane rating, which is too low, or if spark timing is too early, or if deposits in a combustion chamber create hot spots that cause early ignition. In a Diesel-Cycle engine, engine knock can be caused, for example, if fuel injection timing is too early. Engine knock can cause serious damage to the engine. Vibration sensors that are employed as "knock sensors" are typically located on an engine's cylinder block and sometimes on the cylinder head. As an abnormal combustion characteristic, engine knock is not a combustion characteristic that is measured in each engine cycle. Most knock sensors send a base or "no knocking" reference signal to the electronic engine controller and an easily detectable higher signal when engine knock is detected. Because there is a relatively large difference between the reference signal and the signal when engine knock is detected the accuracy of the knock sensor is relatively unimportant. In this respect, knock sensors are only required to make crude measurements since they are configured to detect only engine knock.

More recently, it has been found that by using techniques, for example, to increase the signal-to-noise ratio and to filter out signal noise, it is possible to use vibration sensors to extract a signal that can be used to determine a normal combustion characteristic. The vibration sensor is not exposed to the harsh conditions inside the combustion chamber, but because it is mounted to a component of the engine, and there are many moving parts in an internal combustion engine and in the machinery that the engine is associated with, such as a moving vehicle, the vibrations that the vibration sensor detects include vibrations caused by sources other than combustion. Without processing the raw signal from a vibration sensor to filter out signal noise, the raw signal can not be used as a sufficiently accurate indicator of combustion characteristics other than engine knock. An accurate determination of a combustion characteristic is required in order to improve engine performance and efficiency by adjusting parameters such as, for example, the timing for fuel injection, the fuel injection rate, and the quantity of fuel injected.

A vibration signal can be conditioned and digitized, for example as set out in co-owned U.S. Pat. Nos. 7,133,761 and 7,200,487, respectively entitled "Method and Apparatus for Controlling an Internal Combustion Engine Using Accelerometers", and, "System and Method for Processing an Accelerometer Signal to Assist in Combustion Quality Control in an Internal Combustion Engine". These patents teach that it is possible to use the signal from an accelerometer sensor to directly detect different operating parameters of a diesel engine (for example, the timing for start of combustion (SOC)).

While it can be important to know the timing for SOC to help control combustion in an internal combustion engine, the quality of combustion, combustion efficiency, and engine performance can be better controlled and improved if more combustion characteristics are accurately known for a broad range of the engine cycle, such as the heat release rate profile or the in-cylinder pressure profile during combustion for each cylinder.

Some of the challenges associated with methods for reconstructing the heat release rate profile or the in-cylinder pressure profile for one or more engine cycles for an engine include: engine-to-engine variability, cylinder-to-cylinder variability, and sensor-to-sensor variability. Another challenge associated with such methods is compensating for changes in sensor sensitivity between different engine speeds or load conditions, and changes in sensor sensitivity over time. The sensor performance and characteristics (for example, impedance, sensitivity) can vary from one vibration sensor to another. Also, errors can be introduced if a sensor's charge decay is not taken into account. None of the known references describes a method of reconstructing in-cylinder pressure that includes correcting the vibration signal for the sensor's sensitivity and charge decay. For sensors generally, a known method of addressing charge decay comprises calibrating the sensor, whereby prior knowledge about the sensor's characteristics, including charge decay, is accounted for. Another method for addressing the issue of charge decay in sensors is using a charge amplifier to avoid operating the sensor in voltage mode. None of these methods can compensate for a sensor's charge decay or changes in sensitivity over a dynamic range of different engine conditions to improve processing of sensor signals for better accuracy of the reconstructed combustion characteristics such as heat release rate data or in-cylinder pressure data during combustion for each cylinder.

Accordingly, the utility of methods that use vibration sensors for controlling combustion can be improved if the method for processing of the vibration sensor signal can produce more accurate data pertaining to combustion characteristics such as heat release rate and in-cylinder pressure over a broader range of the combustion portion of the engine cycle for each cylinder. In particular, the processing method can be improved if it can eliminate errors introduced by charge decay and the sensitivity of the vibration sensor.

SUMMARY OF THE INVENTION

A method is disclosed for reconstructing in-cylinder pressure data for an engine cycle of an internal combustion engine, from a vibration signal collected from a vibration sensor mounted on an engine component outside of a combustion chamber. The method comprising the steps of: (a) collecting the vibration signal from the vibration sensor during the engine cycle; (b) filtering the vibration signal to produce filtered data with frequencies in a frequency range associated with combustion effects inside the combustion chamber; (c) processing the filtered data for the engine cycle to produce processed data that is corrected for errors introduced by charge decay and sensor sensitivity by applying at least one correction factor determined as a function of an estimated motoring pressure associated with the engine cycle, being the same engine cycle from which the vibration signal was collected; and, (d) reconstructing the in-cylinder pressure data from the processed data for at least a portion of the engine cycle.

In the processing step there are a number of different ways to calculate the gain error correction factor and the charge decay error correction factor, but in all embodiments, these correction factors are calculated from data determined from the vibration signal itself and engine operational parameters such as the estimated motoring pressure, with this data all determined from the same engine cycle associated with the vibration signal.

In one embodiment, when the vibration signal is collected in a voltage mode, the processing step further comprises applying a gain error correction factor to the filtered data based on a ratio between a value for motoring pressure determined from the estimated motoring pressure at a predetermined timing during the engine cycle before the timing for start of combustion; and a value for the vibration signal also at the predetermined timing. By way of example, the predetermined timing for taking the motoring pressure value and the vibration signal value for calculating the ratio can be between 35 and 20 crank angle degrees before top dead center. The predetermined timing can be dependent upon the engine operating conditions so that this predetermined timing can be different at different points on the operating map. It is preferable for this timing to be as late in the compression stroke as possible while including a safety factor to ensure that it is before the timing for start of combustion.

In addition to correcting for the gain error the method also corrects for the charge decay error, and when the vibration signal is collected in a voltage mode one method for calculating the charge decay error correction factor comprises the steps of: (a) differentiating the filtered data with respect to engine cycle timing measured in crank angle degrees; (b) differentiating the estimated motoring pressure with respect to engine cycle timing measured in crank angle degrees; and (c) correcting for charge decay by applying a charge decay error correction factor to the filtered data by determining a difference on a time scale between timing for a peak differentiated motoring pressure and timing for a peak differentiated vibration signal, and as a function of the difference, determining the charge decay error by calculating a characteristic time scale that defines charge decay rate. After the motoring pressure and the vibration signal have been differentiated, another method of calculating the gain error correction factor is to calculate it as a ratio of the differentiated motoring pressure and the differentiated vibration signal. That is, the gain error correction factor can be calculated based on a ratio between the peak differentiated motoring pressure and the peak differentiated vibration signal, and because the peak differentiated motoring pressure occurs at the steepest part of the motoring pressure curve, it normally occurs during the compression stroke at or around 30 crank angle degrees before top dead center, which is normally before the timing for start of combustion.

In other embodiments the vibration signal is collected in a current mode. In these embodiments, the charge decay error correction factor can be determined by: (a) differentiating the estimated motoring pressure with respect to engine cycle timing measured in crank angle degrees; and (b) correcting for charge decay by applying a charge decay error correction factor to the filtered data by determining a difference on a time scale between timing for a peak differentiated motoring pressure and timing for a peak vibration signal, and as a function of the difference, determining the charge decay error by calculating a characteristic time scale that defines charge decay rate. Then the gain error correction factor can be determined by calculating a ratio between the peak of the differentiated motoring pressure and the peak of the vibration signal, or the gain error correction factor can be calculated by: (a) integrating the vibration signal with respect to engine cycle timing measured in crank angle degrees; and (b) correcting the filtered data by applying a gain error correction factor to the filtered data based on a ratio between a value for motoring pressure determined from the estimated motoring pressure at a predetermined timing during the engine cycle before the timing for start of combustion; and a value for the integrated vibration signal also at the predetermined timing.

In preferred embodiments the estimated motoring pressure is the engine operating parameter that is used to calculate the correction factors. The motoring pressure is estimated from measured engine operating parameters because the advantage of the disclosed method is that it does not require any measurements by in-cylinder pressure sensors. For example, the estimated motoring pressure can be calculated as a function of intake manifold pressure measurements. If the estimated motoring pressure is only required for certain predetermined times, the motoring pressure for such times can be estimated from intake manifold pressure measurements. If the estimated motoring pressure curve is needed, it can be estimated as a function of sampled engine intake manifold pressures by assuming a polytropic curve. By another method, estimated motoring pressure data can be retrieved from a look up table of predetermined motoring pressure curves accessed as a function of intake manifold pressure.

For a given engine certain signal frequency ranges are known to be attributable to signal noise. Normally frequencies above a predetermined frequency can be filtered out, so in preferred embodiments, the filtering step comprises applying a low-pass filter to the vibration signal.

Additional techniques can be applied during the processing step to further improve the accuracy of the reconstructed in-cylinder pressure. For example, in preferred embodiments, the processing step further comprises calculating heat release rate data from the filtered data after it has been corrected for errors introduced by charge decay and sensor sensitivity, wherein heat release data becomes part of the processed data. After calculating the heat release rate, certain abnormalities in the heat release data can become more obvious, especially in the later part of the power stroke, for example, between 30 and 40 degrees after top dead center. This is because after combustion is completed the signal to noise ratio can decline and/or there can be abnormalities that could affect the accuracy of the reconstructed in-cylinder pressure. A boundary correction can be applied to correct out-of-range values of the heat release rate data with predetermined values or the heat release data can be smoothened to produce corrected heat release rate values. Corrected processed data can be calculated from the corrected heat release data but normally the in-cylinder pressure is calculated directly from the corrected heat release data because there is a known correlation between heat release rate and in-cylinder pressure. An advantage of applying a boundary correction as disclosed herein is that it allows accurate in-cylinder pressure data to be reconstructed beyond the range that would be possible using the vibration signal alone. In some embodiments an in-cylinder pressure curve is reconstructed for a portion of the engine cycle between 60 crank angle degrees before top dead center and 60 crank angle degrees after top dead center, and in other embodiments, an in-cylinder pressure curve is reconstructed for a portion of the engine cycle between 30 crank angle degrees before top dead center and 60 crank angle degrees after top dead center.

In another preferred embodiment the processing step further comprises: (a) separating the filtered vibration signal data into a low frequency component and a medium frequency component; (b) correcting the low frequency component to produce a corrected low frequency component by applying a gain error correction factor to the low frequency component based on a ratio between the motoring pressure and the vibration signal, estimating a charge decay error caused by charge decay in the vibration signal in the engine cycle by determining a difference on a time scale between a value of the motoring pressure and a corresponding value of the vibration signal, and based on the charge decay error, calculating a characteristic time scale that defines charge decay rate and correcting for charge decay by applying to the low frequency component a charge decay error correction factor based on the characteristic time scale; (c) correcting the medium frequency component to produce a corrected medium frequency component by applying the gain error correction factor to the medium frequency component; and (d) combining the corrected low frequency component with the corrected medium frequency component. When separating the filtered data into the low frequency component and the medium frequency component, a Fast Fourier Transform is preferably used.

In another embodiment, the processing step employs a transfer function to determine the at least one correction factor, wherein the transfer function is selected from a map of calibrated transfer functions based on engine intake manifold pressure and engine speed. This embodiment follows the same approach as the other methods except that some of the calculations done in the other embodiments are already incorporated into the transfer functions stored in the map.

In preferred embodiments the vibration sensor is mounted on a bearing cap associated with a crankshaft of the engine. When the vibration sensor is mounted on the bearing cap since the engine geometry and component properties are known, the method can further comprising applying a predetermined correction factor to the vibration signal before the processing step, to compensate for a difference in magnitude between a force applied to a piston of an engine cylinder and a force applied to the bearing cap. In preferred embodiments the vibration sensor is located where the vibration signal generated has a signal-to-noise ratio that is at least 4:1, and more preferably at least 6:1.

An example of a preferred embodiment of a method of controlling combustion of fuel within a combustion chamber of an internal combustion engine comprising the steps of: (a) acquiring a vibration signal for an engine cycle from a vibration sensor mounted on an engine component outside of the combustion chamber wherein the vibration signal comprises a component that correlates to in-cylinder pressure, and transmitting the vibration signal to a data acquisition unit; (b) collecting engine data for the engine cycle, being the same engine cycle from which the vibration signal is acquired, the engine data comprising the engine speed, timing for top dead center and intake manifold pressure, and transmitting the engine data to the data acquisition unit; (c) processing the vibration signal in a computer processing unit to produce processed data that is corrected it for an estimated error introduced by signal decay and sensor sensitivity in the vibration signal by applying at least one correction factor determined as a function of the engine data and the vibration signal, and reconstructing an in-cylinder pressure curve for at least a portion of the engine cycle from the processed data; and, (d) transmitting the reconstructed in-cylinder pressure data to a controller for controlling the combustion within the combustion chamber based on the reconstructed in-cylinder pressure data.

For practicing the method, also disclosed is a control system for an internal combustion engine that comprises: (a) a vibration sensor mounted on an engine component outside of a combustion chamber where the vibration sensor is operative to generate a vibration signal when combustion occurs within the combustion chamber during an engine cycle, (b) a data acquisition unit that is operative to receive the vibration signal transmitted from the vibration sensor and to correlate it with engine data associated with the engine cycle, being the same engine cycle associated with the vibration signal, the engine data comprising engine intake manifold pressure and parameters characteristic of engine operation comprising at least one of engine speed and timing for top dead center; (c) a computer processing unit which is operative to receive and process data from the data acquisition unit to estimate an error introduced by vibration signal decay, and apply a correction factor to the vibration signal to generate a corrected vibration signal based on the error, which is determined for the engine cycle, and thereby reconstruct in-cylinder pressure data for at least a portion of the engine cycle from the corrected vibration signal; and, (d) a controller that is operative to control engine operation based on the reconstructed in-cylinder pressure data and the parameters characteristic of engine operation.

In one embodiment, to operate the control system in a current mode, the control system further comprises a resistor electrically connected in parallel to the vibration sensor. With the disclosed system an advantage of operating in a current mode is that it does not require using charge amplifiers as required when operating in a charge mode, and charge amplifiers add to the system cost. In this disclosure "charge" mode is used interchangeably with "voltage" mode. For tested systems it was found that a 10 k to 50 k ohm load resistor worked well for all operating conditions tested.

In preferred systems, the engine component to which the vibration sensor is mounted is in a direct force transfer path from the combustion chamber. A preferred mounting location where suitably high signal-to-noise ratios were obtained was the bearing cap for the engine's crankshaft.

DETAILED DESCRIPTION OF PREFERRED EMBODIMENT(S)

Figure 1:
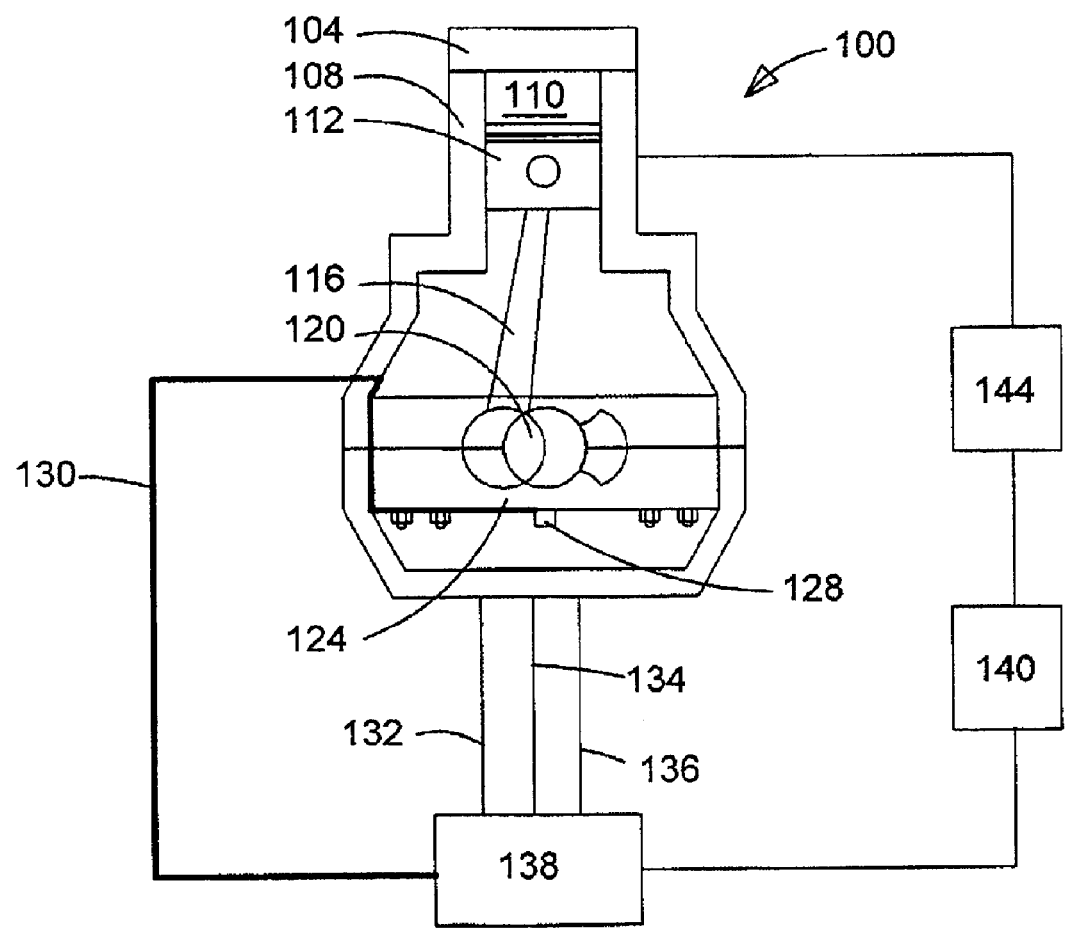
FIG. 1 is a schematic view of an internal combustion engine with a control system that can be used to reconstruct in-cylinder pressure from a vibration signal to determine combustion data that can be used to control the operation of the engine.

FIG. 1 schematically illustrates an internal combustion engine with a control system that can reconstruct the in-cylinder pressure for internal combustion engine 100 from a vibration signal collected by vibration sensor 128. The control system then uses the reconstructed pressure data to control combustion characteristics. Engine 100 includes combustion chamber 110, which in this example is defined by cylinder 108, cylinder head 104 and piston 112. For simplicity only the combustion chamber of one cylinder of an engine is shown although persons skilled in the technology will understand that the engine typically has two or more cylinders, and when there is a plurality of cylinders they can be arranged in banks. Piston 112 is reciprocable within cylinder 108, and the reciprocating motion of piston 112 is translated into rotation of crankshaft 120 via connecting rod 116 which is operatively attached at opposite ends to piston 112 and crankshaft 120 respectively. Intake and exhaust valves (not shown) are operative to deliver charge comprising oxygen from an intake manifold to combustion chamber 110, and to remove products of combustion therefrom to an exhaust manifold. Engine 100 further comprises fuel and air delivery systems, and other standard systems associated with internal combustion engines which, for simplification, are not shown in the figures.

Engine 100 includes vibration sensor 128, shown mounted, for example, on main bearing cap 124. Crankshaft 120 is subjected to sideways loads from the engine cylinder and piston and to reduce the deflection caused by these loads crankshaft 120 is supported by a bearing assembly which comprises bearing cap 124. Bearing cap 124 acts as a damped oscillator by being deflected in response to changes in the in-cylinder pressure. Because forces associated with in-cylinder pressure are transmitted through piston 112 and piston rod 116 to crankshaft 120 and bearing cap 124, there is a direct force transfer path from the combustion chamber to vibration sensor 128 when mounted on bearing cap 124. When bearing cap 128 is located between two cylinders of an engine, sensor 128 can record signals from the two adjacent cylinders and therefore for an engine with six cylinders only three sensors 128 will be needed for collecting signals attributable to the combustion process within each one of the six engine cylinders. This arrangement is possible because when one cylinder is in a combustion phase on the opposite side of the bearing cap the phase of the adjacent cylinder is always offset, and the in-cylinder pressure and the signal from the vibration sensor are negligible during the exhaust and intake phases of the engine cycle. Even so, when collecting experimental data to prove the disclosed method, as described in more detail below, vibration sensors were mounted on each one of the bearing caps so that more data could be collected. After analyzing the experimental results it was confirmed that one vibration sensor mounted on a bearing cap between two cylinders could collect data that could be processed to accurately reconstruct in-cylinder pressure for each of the adjacent cylinders.

In a preferred embodiment, the vibration sensor employed for the present application is an accelerometer, but any other vibration sensors such as any type of velocity or displacement measuring piezoelectric sensors or accelerometer type sensors can be used for the purpose of recording a vibration signal that is further processed for reconstructing the in-cylinder pressure of an internal combustion engine.

The engine bearing caps have been found to be a preferred location for generating a vibration signal with a suitably high signal-to-noise ratio. For a given engine, the signal-to-noise ratio can change for different operating conditions, but for example, for the tested engines, with the vibration sensor mounted to the engine bearing caps a signal-to-noise ratio of at least 4:1 and more typically at least 6:1 was achieved. However, it is understood that there are other locations where a vibration sensor can be mounted, which can also produce signals with a suitably high signal-to-noise ratio. In the context of this disclosure, when discussing "signal-to-noise ratio", the "signal" is the part of the vibration signal that is associated with deflections attributable to the monitored combustion characteristic in combustion chamber 110, and "noise" is the part of the vibration signal that is contributed from other sources not directly attributable to the monitored combustion characteristic, such as, for example, deflections caused by engine vibrations, road noise (for vehicles) or by electrical interference that distorts the transmitted electrical vibration signal. A preferred method of mounting accelerometer sensor 128 is taught by co-owned U.S. Pat. No. 7,444,231, and entitled, "Method of Mounting an Accelerometer on an Internal Combustion Engine and Increasing Signal-To-Noise Ratio".

Generally, vibration sensors that are more directly exposed to the motion imparted by the combustion process generate a signal with a higher signal-to-noise ratio. The applicant has tested a number of engines of different sizes and from different manufacturers using the techniques disclosed in the aforementioned co-owned patents and/or the method disclosed herein, and in all of these tests it was determined that mounting a vibration sensor such as an accelerometer on the bearing cap produced signals with signal-to-noise ratios that were sufficiently high, such that the collected data could be processed according to the disclosed methods to achieve the disclosed results. However, because there are differences in engine architecture, it is understood that for a given engine there can also be other locations such as on bearing cap bolts, cylinder 108, cylinder head 104, or on cylinder head bolts that can also yield a sufficiently high signal-to-noise ratio. Whether or not a mounting location on a particular engine will produce a signal-to-noise ratio that is sufficiently high can be easily determined by collecting data from a sensor mounted at the desired location, processing the data to reconstruct engine combustion data such as the in-cylinder pressure, and comparing the reconstructed data to measurements taken by an in-cylinder pressure sensor. The disclosed method will not produce accurate results if there is too much noise in the signal, that is, if the signal-to-noise ratio is not sufficiently high. For example, if the sensor is mounted on the side of the engine block, where knock sensors are often mounted, there is normally a water jacket that surrounds the cylinders and the ratio between deflections caused by lateral deflections from the cylinder walls that are attributable to combustion effects compared to vibrations caused by noise can be much less than the signal-to-noise ratio for data collected from sensors mounted on the bearing caps. In the applicant's experience, the signal-to-noise ratio for sensors mounted on the side of the engine block is normally not high enough to use the disclosed method for accurately reconstructing combustion characteristics. On the other hand, opposite to signal-to-noise ratios that are too low, vibration signals with higher signal-to-noise ratios can yield more accurate results and in some situations can require less processing to reconstruct combustion characteristics such as the in-cylinder pressure curve and the timing for SOC.

Vibration sensor 128 transmits an electrical signal to data acquisition system 138 through signal wire 130. Other engine characteristics such as, TDC (top dead center) timing 132, engine speed measured in RPM (rotation per minute) 134 and intake manifold pressure 136 are collected from respective data collection sensors and transmitted to data acquisition system 138 and are correlated to the collected vibration signal. TDC and RPM data is used to correlate the vibration signal to the crank angle. Computer processing unit (CPU) 140 retrieves the vibration signal and the associated engine data such as TDC and RPM from data acquisition system 138 and processes the acquired data according to a method for reconstructing the in-cylinder pressure illustrated in either FIG. 2 or FIG. 3 and further described below. The reconstructed in-cylinder pressure is further transmitted to engine controller 144 which uses this information to control fuel combustion within the combustion chamber of the engine, for example, to improve the engine efficiency and/or reduce emissions.

Figure 2:
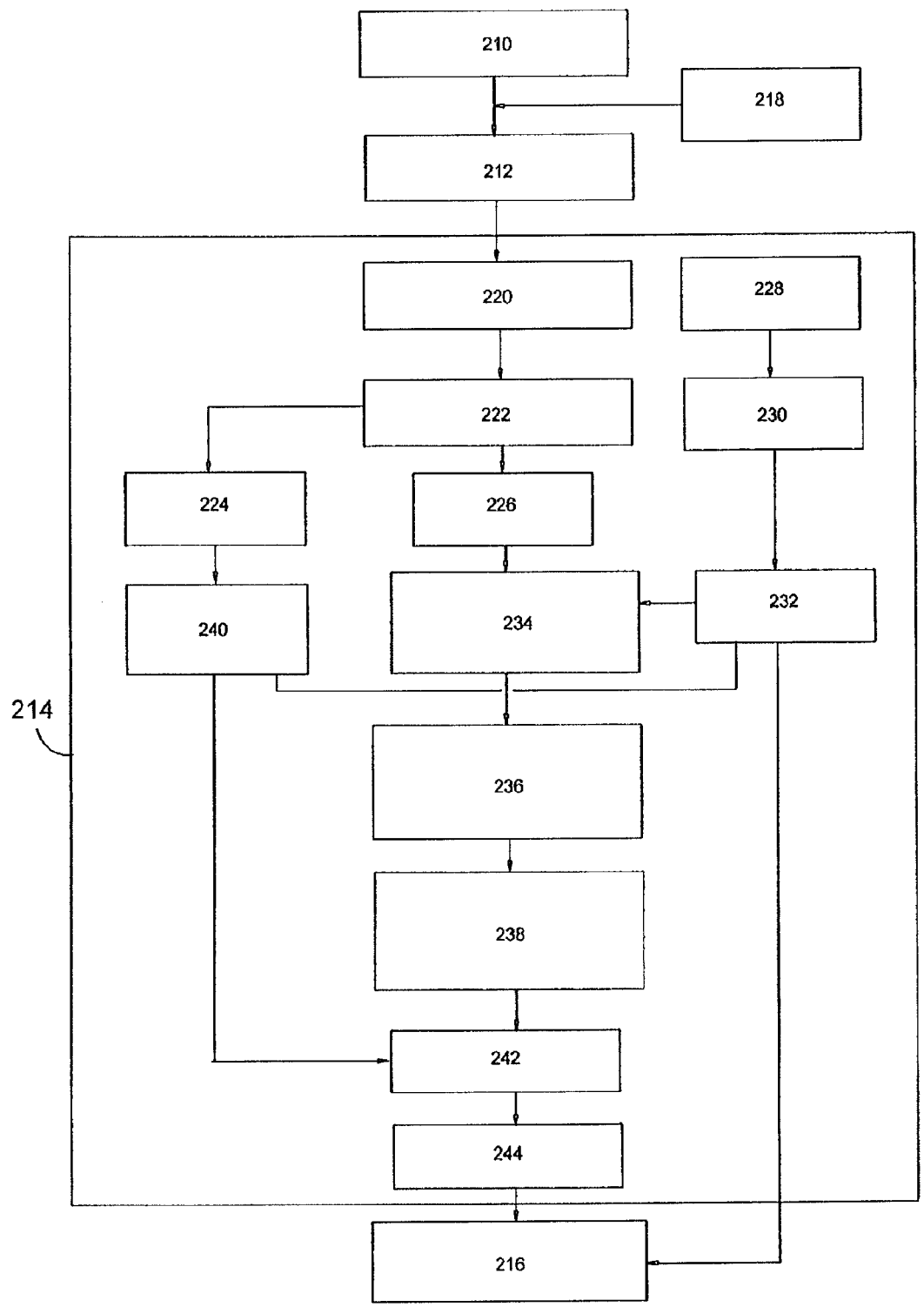
FIG. 2 is a flow diagram that illustrates a preferred embodiment of the method of reconstructing in-cylinder pressure from the vibration signal.
Figure 3:
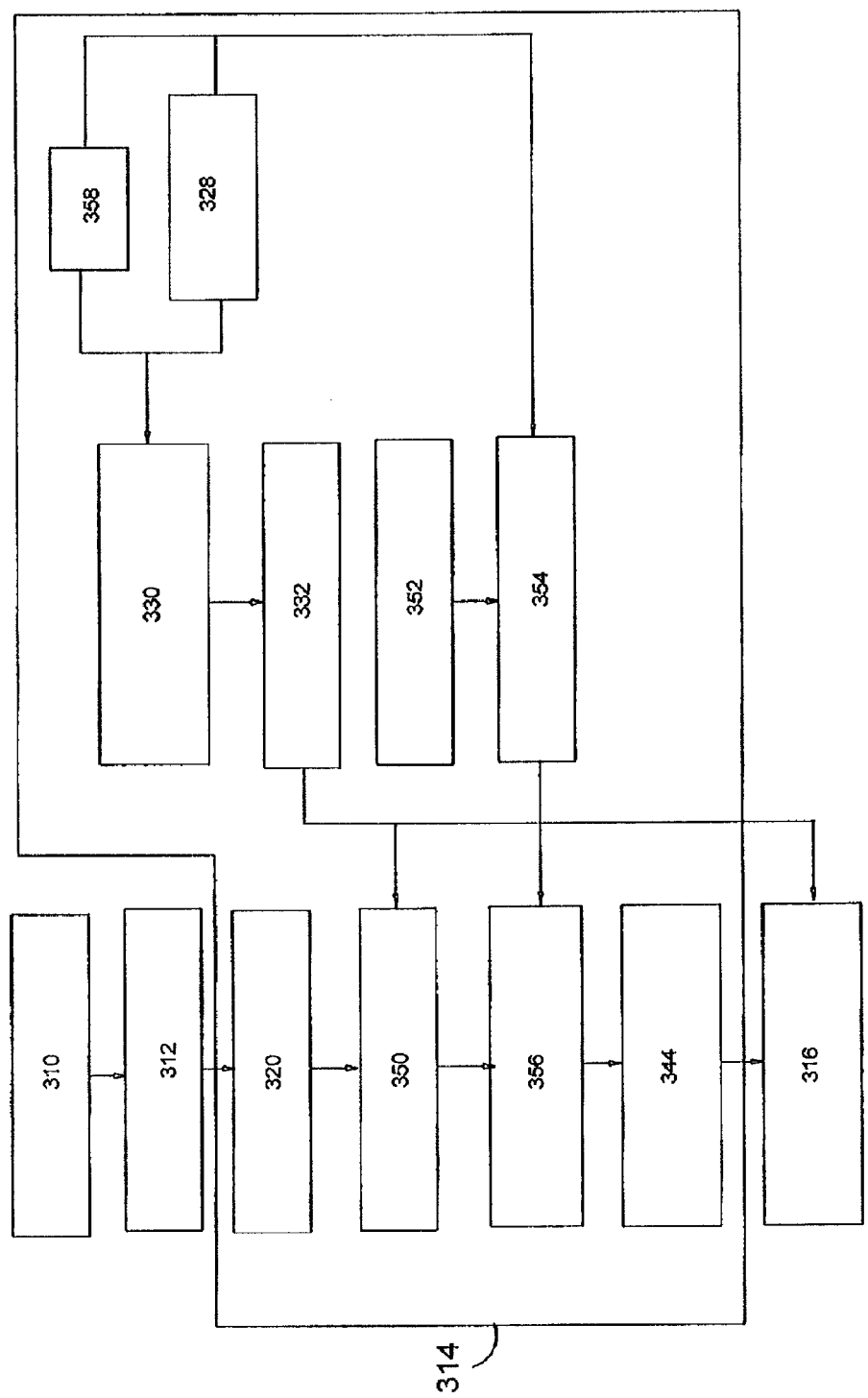
FIG. 3 is a flow diagram that illustrates another embodiment of the method of reconstructing in-cylinder pressure.

Preferred embodiments of the disclosed method of reconstructing the in-cylinder pressure are illustrated in FIGS. 2 and 3. The method disclosed in FIG. 2 comprises first step 210 of acquiring the vibration signal from the vibration sensor, low-pass filtering the acquired vibration signal in step 212, processing the low-pass filtered vibration signal in step 214 and reconstructing the in-cylinder pressure in step 216. The vibration signal is low-pass filtered to remove the high frequency component which is generally associated with the "noise" that is contributed from other sources not directly attributable to the monitored combustion characteristic, such as deflections caused by engine vibrations, road noise (for vehicles) or by electrical interference that distorts the electrical vibration signal. Depending on the location of the vibration sensor on the internal combustion engine, the vibration signal acquired in step 210 might need to be corrected in step 218 to compensate for the difference between the force acting on the support of the vibration sensor, respectively on bearing cap 124 and the force generated by combustion which is applied to piston 112. The force acting on bearing cap 124 when combustion occurs during an engine cycle triggers the vibrations measured by vibration sensor 128. This force is not the same as the force applied on piston 112 generated by the combustion process taking place within combustion chamber 110. Piston 112 is closer to the combustion chamber compared to the bearing cap, and because vibrations measured at the bearing cap have been transmitted through connecting rod 116 and crankshaft 120, a force-based correction can be applied to the vibration signal to compensate for the difference between the combustion force applied to piston 112 and the combustion force applied to bearing cap 124. If vibration sensor 128 is mounted at a different location, where there is a suitably high signal-to-noise ratio, a different force-based correction of the vibration signal can be applied, or no correction at all if the force generated by the combustion process is acting directly on the component to which the vibration sensor is mounted. That is, vibration sensor 128 can be placed in other locations on the engine and it is understood that the force-based correction applied to the vibration signal will depend on the location of the sensor.

Processing step 214 involves taking the low-pass filtered vibration signal and processing the acquired vibration signal data to transform it into a processed signal or a processed data set that can be represented by a curve that more accurately illustrates the heat release rate or the in-cylinder pressure within the combustion chamber of a cylinder during combustion. Processing step 214 can comprise several sub-steps as shown in FIG. 2. In a preferred embodiment the acquired vibration signal is differentiated with respect to the crank angle in sub-step 220 and in sub-step 222 the differentiated signal is separated into medium frequency component 224 and low frequency component 226 at around 500 Hz using a Fast Fourier Transform (FFT). That is, low frequency component 226 comprises the component of the differentiated signal that has a frequency below 500 Hz and medium frequency signal 224 comprises the component of the differentiated signal that has a frequency above 500 Hz, and these two components of the differentiated signal are stored separately in CPU 140.

If the signal-to-noise ratio is high enough, sub-step 222, which involves separating the differentiated signal into medium and low frequency components, can be omitted with the differentiated signal processed as further described below for the low frequency component of the signal. For a given engine, it can be determined whether sub-step 222 can be omitted by collecting and processing data with sub-step 222 included in the processing steps, and comparing the results to the results obtained from data collected and processed without including sub-step 222 in the processing steps. If the results are substantially the same, then it can be determined that the signal-to-noise ratio is high enough to allow sub-step 222 to be omitted.

In another embodiment of the disclosed method, the engine intake manifold pressure is sampled in sub-step 228 and in sub-step 230 a motoring pressure curve of the engine is estimated based on the engine intake manifold pressure and the assumption that in-cylinder compression is polytropic. The estimated motoring pressure curve is then differentiated with respect to the crank angle in sub-step 232 and compared in sub-step 234 with low frequency component 226 of the differentiated vibration signal. By comparing the difference in magnitude between the low frequency component of the differentiated vibration signal and the differentiated motoring pressure curve, the gain error is determined in sub-step 234. The difference in magnitude, which is the gain error, is based on the fact that the estimated motoring pressure curve is represented on a pressure scale and the vibration signal is represented on a voltage scale. Since the result to be achieved by the present method is to reconstruct the in-cylinder pressure curve, the vibration signal is corrected for the gain error by applying a gain error correction factor when it is converted from a voltage scale to a pressure scale. Tests have shown that a fairly accurate correction for the gain error can be achieved by multiplying the vibration signal by a gain error correction factor which represents the ratio between the an estimated value for a motoring pressure at a predetermined time during the compression stroke of the engine cycle before the timing for start of combustion, and a corresponding voltage taken from the vibration signal measured at the same predetermined time during the compression stroke. It is preferable for this predetermined time during the compression stroke to be closer to the timing for start of combustion, and a timing between 35 and 20 degrees before top dead center is suitable. This timing can be predetermined dependent on the operating conditions, so that timing can be different at different points on the engine map. However, because the estimated motoring pressure is used to calculate this ratio, the predetermined timing must be before the timing for start of combustion since the vibration signal measured after start of combustion includes a combustion component whereas the motoring pressure signal does not.

A second correction factor, referred to herein as a charge decay error correction factor corrects for sensor sensitivity and charge decay. For estimating the sensor charge decay error, a characteristic time scale that defines the charge decay rate is determined by calculating the time shift between the differentiated motoring pressure and the differentiated vibration signal voltage. The time shift can be measured by measuring the time difference between the timing for the peak differentiated motoring pressure and the timing for the peak differentiated vibration signal. The determination of this time shift can be done during comparison sub-step 234. Based on the estimated phase shift a characteristic time scale that defines the speed of charge decay for the vibration sensor is determined in sub-step 236. With the speed of charge decay determined, a charge decay error correction factor can be also be determined in sub-step 236.

In sub-step 238 the low frequency component of the vibration signal is corrected for the gain error and for the charge decay error by applying the charge decay error correction factor and the gain error correction factor.

Medium frequency component 224 of the vibration signal is generally not corrected for charge decay because by having a higher frequency, the medium frequency signal component is generated over a shorter period of time and therefore it is less influenced by the sensor's sensitivity and charge decay. The medium frequency component of the signal is generally attributed more to the actual fuel combustion while the low frequency signal is generally attributed to characteristics associated with the entire engine cycle. In sub-step 240, medium frequency component 224 is corrected for the voltage to pressure scale conversion by applying a gain error correction factor in the same way that the low frequency component was corrected for this conversion. In sub-step 242, the corrected low frequency component of the differentiated vibration signal is re-combined with the corrected medium frequency component of the differentiated vibration signal.

For more accurate results in reconstructing the in-cylinder pressure, the heat release rate can be calculated from the corrected vibration signal in sub-step 244. Abnormal values caused by noise in the signal are more likely to occur in the signal after a crank angle of about 40 degrees after TDC because at this stage of the engine cycle the in-cylinder pressure has diminished to a level that makes the vibration signal more susceptible to signal noise that could result in inaccurate reconstruction of the in-cylinder pressure. Fuel combustion generally takes place at crank angles between around 20 degrees prior to TDC and around 30 degrees after TDC. In sub-step 244, using the calculated heat release rate, abnormal values in the processed signal at crank angles greater than a predetermined timing (preferably between 30 to 40 degrees after TDC), are detected and the calculated heat release rate is made to follow a predetermined curve that follows a predetermined exponential decay profile. In this way abnormal values caused by signal noise are eliminated before in-cylinder pressure is reconstructed from the heat release rate. The predetermined curve can be based on values for the heat release rate that are empirically determined or calculated from computer modeling. This correction to the heat release rate data is referred to herein as a boundary correction because it extends the data range beyond the normal boundary after which accurate information from a vibration signal is not otherwise possible.

Finally, in step 216 of the disclosed embodiment of the method shown in FIG. 2, because there is a known correlation between heat release rate and the in-cylinder pressure, a function can be applied to the heat release rate data to reconstruct the in-cylinder pressure curve.

In a variant to the embodiment shown in FIG. 2, a resistor is electrically connected in parallel to the vibration sensor such that the vibration signal can be measured in "current mode" and not in "voltage mode" as described above. When this variant to the embodiment is employed, several steps of processing the signal as illustrated in FIG. 2 and described above are changed so that the vibration signal is appropriately processed to yield accurate results. In particular, when using a current mode, the vibration sensor signal already has a profile that is like the differentiated voltage signal, so the current sensor signal does not need to be differentiated before being compared to the differentiated motoring pressure to determine the time shift calculated to determine the characteristic time scale and the speed of decay, when determining the charge decay error correction factor. Instead of differentiating a vibration signal that is collected in a current mode, in sub-step 220, the collected vibration signal 210 can be integrated in sub-step 220 so it can be compared to the motoring pressure data to calculate the gain error correction factor as described above. In this embodiment, frequency separation sub-step 222 can be avoided because the signal collected in a current mode is less distorted compared to a signal collected in voltage mode.

The method illustrated in FIG. 3 shows another embodiment of the disclosed method of reconstructing in-cylinder pressure from vibration signals. This embodiment has several steps that are equivalent to like steps of the embodiment illustrated in FIG. 2 which have been identified by like reference numbers, raised by an increment of one hundred. For example, with reference to FIG. 3, persons skilled in the technology will understand that in this disclosure step 310 is equivalent to step 210 in that they both refer to steps that perform a similar function in substantially the same way in their respective embodiments. Accordingly, if a like step has already been discussed with reference to the embodiment shown in FIG. 2, when describing the embodiment shown in FIG. 3, the same description may not be repeated if the meaning has been made clear from the description of the like step in the discussion of the embodiment shown in FIG. 2.

With reference now to FIG. 3, the vibration signal acquired in step 310 is low-pass filtered in step 312 to remove the high frequency component of the signal which is generally associated with the "noise" that is contributed from other sources not directly attributable to the monitored combustion characteristic. The low-pass filtered signal is further processed in step 314 and the in-cylinder pressure is reconstructed from the processed vibration signal in step 316. In this embodiment the vibration signal is not corrected based on the force acting on the sensor because the sensor is placed where the measured vibrations correlate even more directly to deflections caused by changes in the in-cylinder pressure. With this embodiment of the method, like in other embodiments, the vibration sensor is still located outside of the combustion chamber, but in a location where the sensor produces a signal with a higher signal-to-noise ratio, for example because of differences in the engine architecture or because the sensor is mounted in a location where it is more directly exposed to the motion imparted by combustion behavior. Therefore, in this embodiment the low-pass filtered and differentiated signal is not separated into a low frequency component and a medium frequency component.

Like processing step 214 described in relation to FIG. 2, processing step 314 shown in FIG. 3 comprises several sub-steps for processing the low-pass filtered vibration signal to transform the vibration signal acquired from the vibration sensor into a signal represented in a curve that more accurately illustrates the in-cylinder pressure within the combustion chamber. In sub-step 320 the acquired vibration signal is differentiated with respect to crank angle measurements.

As shown by FIG. 3, other data inputs can be used by processing step 314 to reconstruct in-cylinder pressure. In this embodiment motoring pressure data is estimated from measured engine operational parameters. In sub-step 328 engine intake manifold pressure data is sampled and in sub-step 358 engine speed data (RPM) is collected. Data collected by sub-steps 328 and 358 is used in sub-step 330 to estimate a motoring pressure curve for the engine using predetermined thermodynamic models. In sub-step 332 the estimated motoring pressure curve is differentiated with respect to the measured crank angle and in sub-step 350 it is compared to the differentiated vibration signal from sub-step 320. Like in the embodiment described in relation to FIG. 2, in the embodiment shown in FIG. 3, the comparison done in sub-step 350 identifies a difference in magnitude between the differentiated vibration signal and the estimated motoring pressure curve, which is caused by the conversion from a voltage scale to a pressure scale. In sub-step 350, the vibration signal is corrected for the gain error caused by the conversion from a voltage scale to a pressure scale. Like in the previously described embodiment, an acceptably accurate correction is achieved by multiplying the vibration signal by a factor which represents the ratio between the motoring pressure at a predetermined timing during the compression stroke prior to the timing for start of combustion and a corresponding vibration signal voltage determined at the same predetermined timing. The ratio can also be determined from the value of the differentiated motoring pressure and the corresponding value of the differentiated vibration signal at the same predetermined timing.

In this embodiment the estimation of the charge decay error caused by the sensor sensitivity and charge decay is based on a transfer function. A map of transfer functions is accessed in step 352 by CPU 140 from data acquisition unit 138 where the mapped transfer functions are stored and a transfer function is selected in step 354 from this map of calibrated transfer functions based on the measured intake manifold pressure taken from sub-step 328 and engine speed taken from sub-step 358. The selected transfer function is applied to the vibration signal in sub-step 356, whereby the signal is corrected for the charge decay error caused by the sensor's sensitivity and charge decay.

Like in other embodiments, in sub-step 344, for more accurate results, to correct for abnormal values in the later part of the power stroke, the heat release rate can be calculated from the processed vibration signal and a boundary correction can be applied after a predetermined time during the power stroke. The timing for the predetermined time during the power stroke can be a function of engine operating conditions so that this predetermined time can be different at different points on the engine map. By way of example, the predetermined time can be between 30 and 40 crank angle degrees after TDC.

In step 316, since there is a known correlation between in-cylinder pressure and heat release rate, reconstructing the in-cylinder pressure from the corrected heat release rate is the last step of the disclosed method.

Like with the embodiment described in relation to FIG. 2, with the embodiment described in relation to FIG. 3, in a variant to the disclosed method, not illustrated, a resistor can be connected in parallel to the vibration sensor within the electrical measuring circuit and this reduces distortion in the vibration signal whereby the sub-step for differentiating the vibration signal illustrated in FIGS. 2 and 3 is not needed. Only the motoring pressure needs to be differentiated to determine the charge decay error correction factor. The gain error correction factor can be determined by comparing the differentiated motoring pressure to the vibration signal or the vibration signal can be integrated for comparison with the estimated motoring pressure. In this case, no separation of the signal into low and medium frequencies is necessary because the signal collected in current mode is less distorted compared to the signal collected in voltage mode To prove the presently disclosed method, experimental data was collected from tests conducted using two Cummins™ model ISB engines. Prior to engine testing, all seven bearing caps on each engine were removed and machined for mounting vibration sensors. The vibration sensors used in these tests were Siemens™ knock sensors with an integrated connector design. Each engine was fully commissioned in a test cell and baseline tests were conducted at the rated power and torque. A Kistler™ model 6607C 1 water-cooled pressure transducer was installed in each cylinder, and used to measure the in-cylinder pressure from directly within the cylinders. A Cummins™ high speed data acquisition system was used to collect the pressure and vibration sensor data generated during the engine testing.

Data from the vibration sensor and in-cylinder pressure sensor from each of the two engines were collected at 6 modes selected from 13 modes defined by the European Stationary Cycle ("ESC").

TABLE 1

Engine Test Modes

| ESC Mode | % Load | Torque (lb-ft) | Speed (RPM) | Power (BHP) | Start of Injection (SOI) |
|---|---|---|---|---|---|
| 5 | 50 | 305 | 1885 | 109 | A, n, r |
| 6 | 75 | 457.5 | 1885 | 164 | A, n, r |
| 8 | 100 | 610 | 2292 | 266 | A, n, r |
| 9 | 25 | 152.5 | 2292 | 67 | A, n, r |
| 12 | 75 | 457.5 | 2698 | 235 | A, n, r |
| 13 | 50 | 305 | 2698 | 157 | A, n, r |

The test conditions are summarized in Table 1. Under the heading "Start of injection (SOI)" this refers to the timing for the beginning of the fuel injection pulse for introducing fuel into the combustion chamber. In this column, "a" refers to advanced timing, meaning that the fuel was introduced earlier than normal, "n" is the normal timing that is believed to be the optimal timing, and "r" refers to timing that is retarded or later than the normal timing.

The reconstructed in-cylinder pressure and the heat release rate (HRR) were calculated using the disclosed method of processing vibration sensor data. In this embodiment of the method, the vibration signal was low pass filtered to remove the high frequency component of the vibration signal that is associated with signal noise and the differential voltage signal ($dV/d\theta$) of the signal voltage differentiated with respect to engine cycle crank angle degrees, was computed from the filtered vibration signal. Then a Fast Fourier Transform (FFT) was used to separate the filtered signal into a "low" frequency signal for the component of the filtered signal with frequencies less than 500 Hz and a "medium" frequency signal for the component of the filtered signal with frequencies higher than 500 Hz. The low frequency signal and the medium frequency signal were stored separately. During the same engine cycle during which the vibration signal was sampled, the intake manifold pressure was sampled and the motoring pressure curve for the engine cycle was estimated assuming polytropic compression. Then, like the filtered vibration signal, the estimated motoring pressure curve was differentiated with respect engine cycle crank angle degrees to calculate the differential pressure ($dp/d\theta$). The calculated values for $dV/d\theta$ and $dp/d\theta$ were processed to find the respective timing and value for the peak of each of the differentiated voltage signal and the differentiated motoring pressure signal. The ratio of the peak value of $dp/d\theta$ and $dV/d\theta$ was determined to calculate a gain correction factor that was used to correct both the low and medium frequency signals. In the time domain, the shift in timing between the peak for $dp/d\theta$ and the peak for $dV/d\theta$ was correlated to a characteristic time scale defining the speed of charge decay for the vibration signal under a step-load input. Only the low frequency signal was corrected for the phase shift and decay using the characteristic time scale correlated to the measured time shift. Then the corrected low and medium frequency signals were re-combined and the HRR was calculated from the corrected vibration signal. Near the end of combustion, the calculated HRR can be more susceptible to noise because the magnitude of the combustion portion of the signal is declining. The HRR data was further corrected at this boundary portion by selecting a predetermined timing during the power stroke and substituting a predetermined curve for the final segment on the time scale. Finally, the in-cylinder pressure was reconstructed from the corrected HRR.

Figure 4:
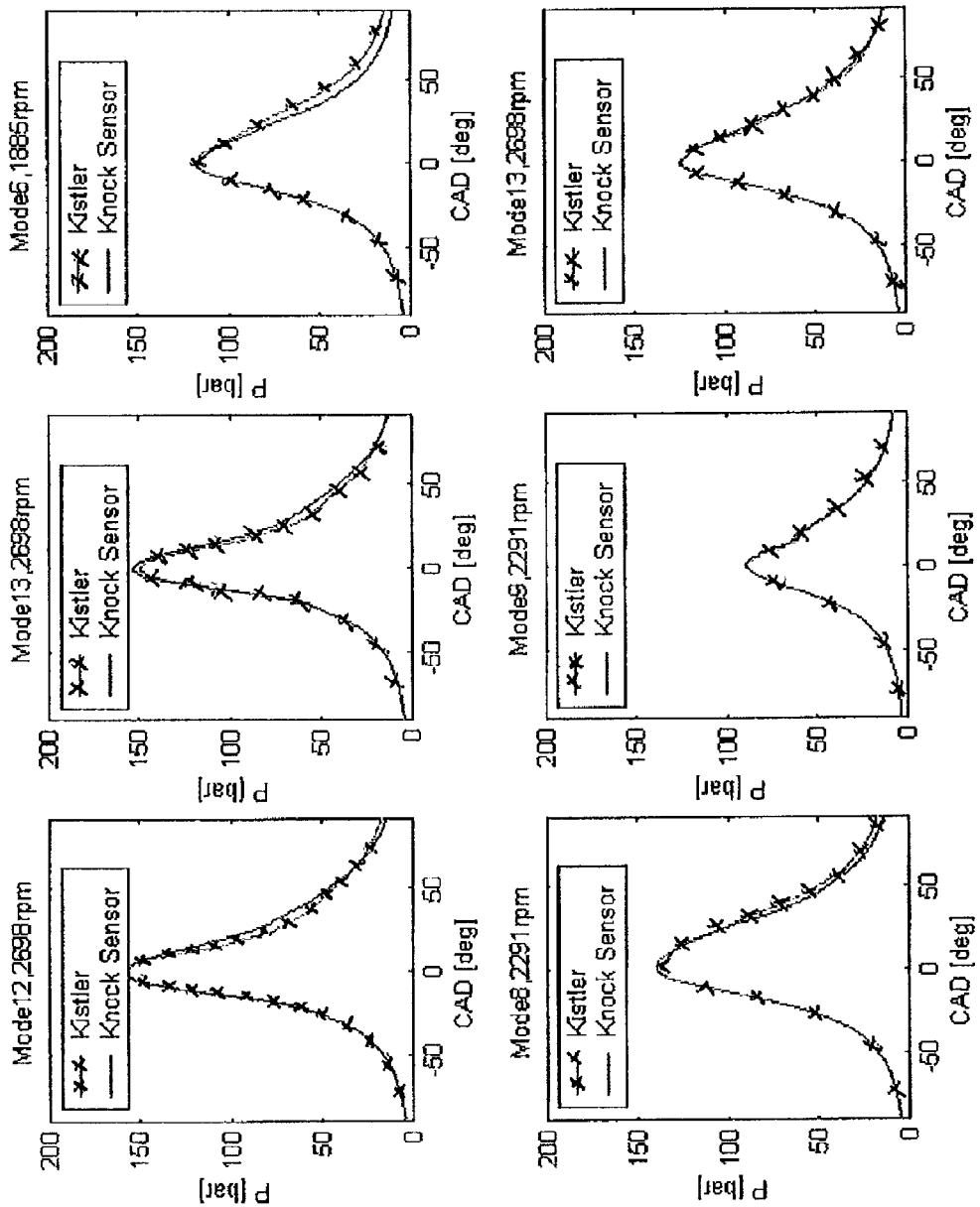
FIG. 4 shows plots of data for a diesel engine that compare the in-cylinder pressure reconstructed from the vibration signal with direct measurements of in-cylinder pressure obtained using an in-cylinder pressure sensor.
Figure 5:
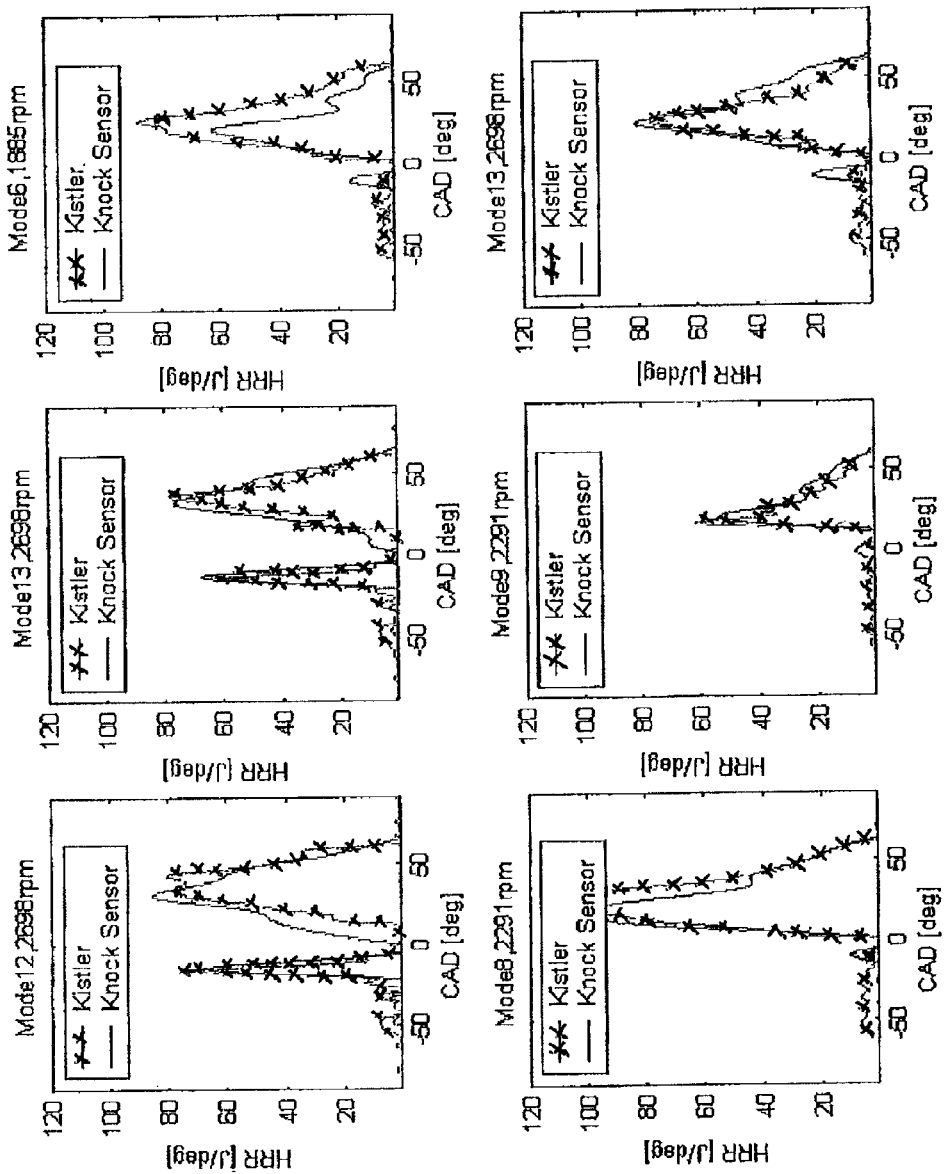
FIG. 5 shows plots of data for a diesel engine that compare the heat release rate calculated based on the in-cylinder pressure reconstructed from measured vibration signals with the heat release rate calculated based on the direct measurements of an in-cylinder pressure obtained using an in-cylinder pressure sensor.

The in-cylinder pressure and HRR reconstructed from the vibration signal using the disclosed method were compared with the data derived from the Kistler pressure transducers. The results of the comparison are illustrated in FIGS. 4 and 5, respectively. What these figures show is a very close correlation between the two sets of data, with the reconstructed in-cylinder pressure data shown in FIG. 4 essentially overlapping the in-cylinder pressure that was directly measured by the Kistler sensor.

Figure 6:
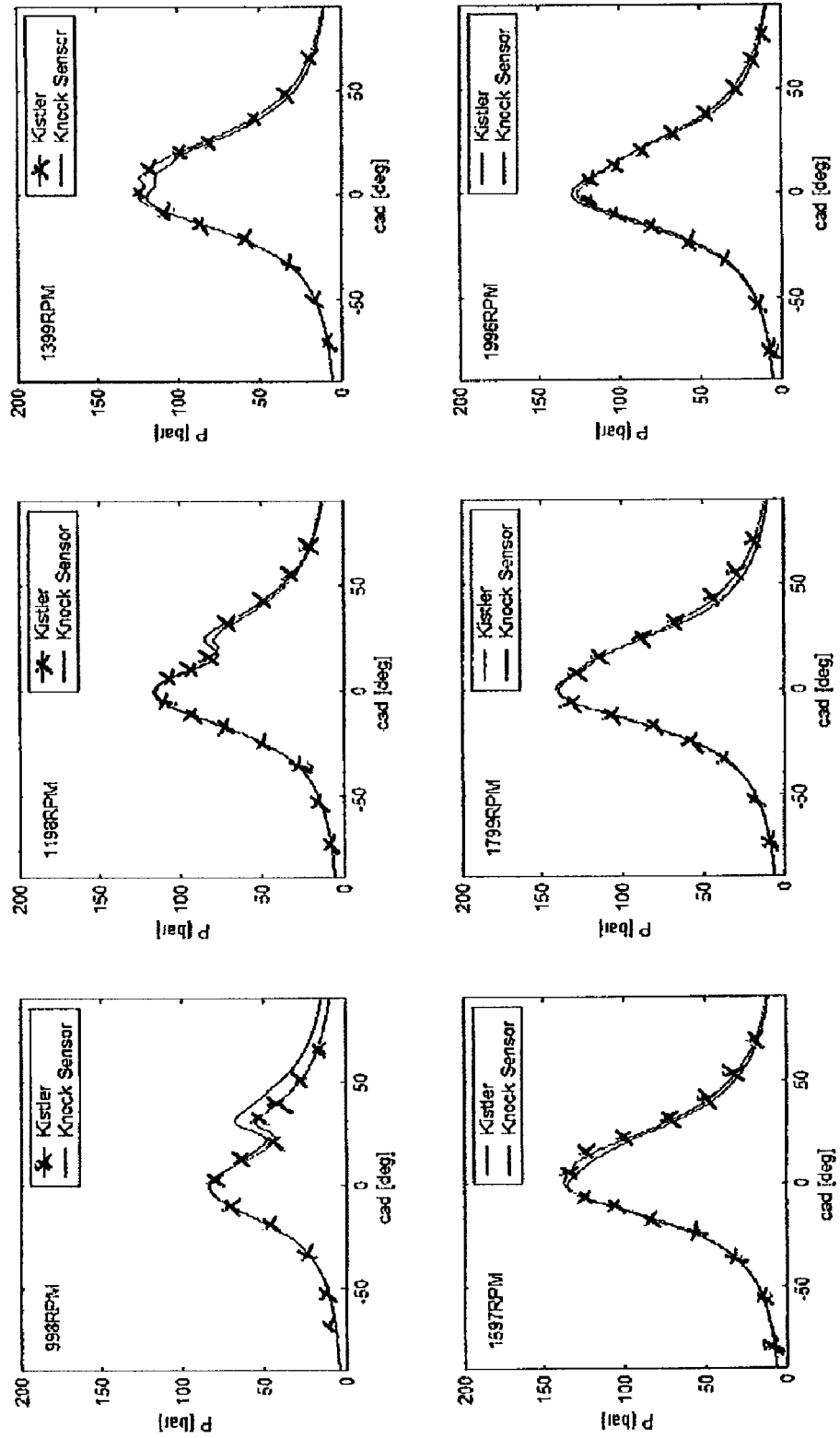
FIG. 6 shows plots of data for a natural gas engine that compare the in-cylinder pressure of a natural gas engine reconstructed from the vibration signal with direct measurements of in-cylinder pressure obtained using an in-cylinder pressure sensor.

More tests have been performed in a test cell on a Cummins™ model ISX engine equipped with a Westport™ high pressure direct injection gas fuelling system. Two Siemens™ knock sensors were installed on bearing caps number 2 and 5 and their signals were used to reconstruct the in-cylinder pressure for cylinders number 1, 2, 4 and 5. All cylinders were equipped with Kistler™ in-cylinder pressure sensors. Experimental data was taken at 0, 25, 50, 75 and 100% load and speed from 700 to 2000 rpm with increments of 200 rpm. Some of the results produced using the presently disclosed method are shown in FIG. 6. Again a very close correlation was found between the set of data derived from the Kistler pressure transducers and the data reconstructed by processing the vibration data measured by the Siemens™ knock sensors. More tests were performed in road conditions using a Cummins™ model ISX engine equipped with a Westport™ high pressure direct injection gas fuelling system installed onboard of a truck and the results were compared to test cell data under similar operating conditions. It was found that the in-cylinder pressure values reconstructed from the vibration sensor data were comparable with the test cell measurements.

Similar results were obtained from performing similar tests on larger size engines (for example, engines with displacements up to 48 liters). Accordingly, the effectiveness of the disclosed method and apparatus has been proven on a variety of engines using different fuels and different combustion strategies, and the disclosed results obtained from Cummins™ model ISB and ISX engines are used herein only as illustrative examples. One of the advantages of the disclosed method and apparatus is that it has proven to be adaptable to yield accurate reconstructions of the in-cylinder pressure for different engine designs. It is believed that the disclosed method can be scaled and calibrated for many types of internal combustion engines. That is, the method can work regardless of the engine cycle, such as, the Otto Cycle, the Diesel Cycle or other types of compression ignition engines such as homogeneous charge compression ignition engines, and the method will also work regardless of the type of fuel, which could be, for example, gasoline, diesel, natural gas, hydrogen, or propane. Previous to this disclosure and other developments disclosed in co-owned patents and patent applications relating to this method, it was generally believed that in-cylinder pressure data reconstructed from vibration data collected from sensors mounted outside of the combustion chamber could not produce results accurate enough to replace in-cylinder pressure sensors. The results disclosed herein, which were produced using the disclosed method, show that the accuracy of in-cylinder pressure data reconstructed from vibration sensor data can be accurate enough to be used to control combustion in an internal combustion engine, while providing the advantages associated with the vibration based techniques in comparison with the in-cylinder techniques, including low cost, non-intrusive mounting and higher reliability due to higher redundancy and due to placement of the sensors in a less severe environment.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of processing a vibration signal collected from a vibration sensor mounted on an engine component outside of a combustion chamber to reconstruct in-cylinder pressure data for an engine cycle of an internal combustion engine, the method comprising the steps of:
   (a) collecting said vibration signal from said vibration sensor during said engine cycle and transmitting said vibration signal to a data acquisition unit;
   (b) processing said vibration signal in a computer processing unit by:
       (i) filtering said vibration signal to produce filtered data with frequencies in a frequency range associated with combustion effects inside said combustion chamber;
       (ii) processing said filtered data for said engine cycle to produce processed data that is corrected for errors introduced by charge decay and sensor sensitivity by applying at least one correction factor determined as a function of an estimated motoring pressure associated with said engine cycle, being the same engine cycle from which said vibration signal was collected; and
   (c) in said computer processing unit reconstructing said in-cylinder pressure data from said processed data for at least a portion of said engine cycle.

2. The method of claim 1 wherein said vibration signal is collected in a voltage mode, said processing step further comprises applying a gain error correction factor to said filtered data based on a ratio between a value for motoring pressure determined from said estimated motoring pressure at a predetermined timing during said engine cycle before the timing for start of combustion; and a value for said vibration signal also at said predetermined timing.

3. The method of claim 2 wherein said predetermined timing is between 35 and 20 crank angle degrees before top dead center.

4. The method of claim 1 wherein said vibration signal is collected in a voltage mode, said processing step further comprises:
   (iii) differentiating said filtered data with respect to engine cycle timing measured in crank angle degrees;
   (iv) differentiating said estimated motoring pressure with respect to engine cycle timing measured in crank angle degrees;
   (v) correcting for charge decay by applying a charge decay error correction factor to said filtered data by determining a difference on a time scale between timing for a peak differentiated motoring pressure and timing for a peak differentiated vibration signal, and as a function of said difference, determining said charge decay error by calculating a characteristic time scale that defines charge decay rate.

5. The method of claim 4 further comprising correcting said filtered data by applying a gain error correction factor, which is calculated based on a ratio between said peak differentiated motoring pressure and said peak differentiated vibration signal.

6. The method of claim 1 wherein when said vibration signal is collected in a current mode, said processing step further comprises:
   (iii) differentiating said estimated motoring pressure with respect to engine cycle timing measured in crank angle degrees;
   (iv) correcting for charge decay by applying a charge decay error correction factor to said filtered data by determining a difference on a time scale between timing for a peak differentiated motoring pressure and timing for a peak vibration signal, and as a function of said difference, determining said charge decay error by calculating a characteristic time scale that defines charge decay rate.

7. The method of claim 6 further comprising the steps of:
   (d) integrating said vibration signal with respect to engine cycle timing measured in crank angle degrees;
   (e) correcting said filtered data by applying a gain error correction factor to said filtered data based on a ratio between a value for motoring pressure determined from said estimated motoring pressure at a predetermined timing during said engine cycle before the timing for start of combustion; and a value for the integrated vibration signal also at said predetermined timing.

8. The method of claim 1 further comprising calculating said estimated motoring pressure for said engine cycle as a function of intake manifold pressure measurements.

9. The method of claim 1 further comprising determining said estimated motoring pressure by calculating a motoring pressure curve that is calculated as a polytropic curve that is a function of sampled engine intake manifold pressures.

10. The method of claim 1 further comprising retrieving said estimated motoring pressure from a look up table of predetermined motoring pressure curves accessed as a function of intake manifold pressure.

11. The method of claim 1 wherein said filtering step comprises applying a low-pass filter to said vibration signal.

12. The method of claim 1 wherein said processing step further comprises calculating heat release rate data from said filtered data after it has been corrected for errors introduced by charge decay and sensor sensitivity, wherein heat release data becomes part of said processed data.

13. The method of claim 12 further comprising the steps of:
   (d) at a predetermined time after peak combustion pressure, correcting out-of-range values of said heat release rate data with predetermined values to produce corrected heat release rate values, and
   (e) computing corrected processed data based on said corrected heat release rate values.

14. The method of claim 13 wherein said predetermined time after peak combustion pressure is between 30 and 40 degrees after top dead center.

15. The method of claim 1 further comprising reconstructing an in-cylinder pressure curve for a portion of said engine cycle between 60 crank angle degrees before top dead center and 60 crank angle degrees after top dead center from said in-cylinder pressure data.

16. The method of claim 1 further comprising reconstructing an in-cylinder pressure curve for a portion of said engine cycle between 30 crank angle degrees before top dead center and 60 crank angle degrees after top dead center from said in-cylinder pressure data.

17. The method of claim 1 wherein said processing step further comprises:
   (iii) separating said filtered vibration signal data into a low frequency component and a medium frequency component;
   (iv) correcting said low frequency component to produce a corrected low frequency component by;

(aa) applying a gain error correction factor to said low frequency component based on a ratio between said motoring pressure and said vibration signal;
(bb) estimating a charge decay error caused by charge decay in said vibration signal in said engine cycle by determining a difference on a time scale between a value of said motoring pressure and a corresponding value of said vibration signal; and
(cc) based on said charge decay error, calculating a characteristic time scale that defines charge decay rate and correcting for charge decay by applying to said low frequency component a charge decay error correction factor based on said characteristic time scale;
(v) correcting said medium frequency component to produce a corrected medium frequency component by applying said gain error correction factor to said medium frequency component; and
(vi) combining said corrected low frequency component with said corrected medium frequency component.

18. The method of claim 17 further comprising using a Fast Fourier Transform to separate said filtered data into said low frequency component and said medium frequency component.

19. The method of claim 1 wherein said processing step employs a transfer function to determine said at least one correction factor, wherein said transfer function is selected from a map of calibrated transfer functions based on engine intake manifold pressure and engine speed.

20. The method of claim 1 wherein said vibration sensor is mounted on a bearing cap associated with a crankshaft of said engine.

21. The method of claim 20 further comprising applying a predetermined correction factor to said vibration signal before said processing step, to compensate for a difference in magnitude between a force applied to a piston of an engine cylinder and a force applied to said bearing cap.

22. The method of claim 1 wherein said vibration signal has a signal-to-noise ratio that is at least 4:1.

23. The method of claim 1 wherein said vibration signal has a signal-to-noise ratio that is at least 6:1.

24. A method of controlling combustion of fuel within a combustion chamber of an internal combustion engine comprising the steps of:
(a) acquiring a vibration signal for an engine cycle from a vibration sensor mounted on an engine component outside of said combustion chamber wherein said vibration signal comprises a component that correlates to in-cylinder pressure, and transmitting said vibration signal to a data acquisition unit;
(b) collecting engine data for said engine cycle, being the same engine cycle from which said vibration signal is acquired, said engine data comprising the engine speed, timing for top dead center and intake manifold pressure, and transmitting said engine data to said data acquisition unit;
(c) processing said vibration signal in a computer processing unit to produce processed data that is corrected for an estimated error introduced by signal decay and sensor sensitivity in said vibration signal by applying at least one correction factor determined as a function of said engine data and said vibration signal, and reconstructing an in-cylinder pressure curve for at least a portion of said engine cycle from said processed data; and
(d) transmitting said reconstructed in-cylinder pressure data to a controller for controlling the combustion within said combustion chamber based on said reconstructed in-cylinder pressure data.

25. The method of claim 24 further comprising estimating motoring pressure data for said engine cycle from said engine data and determining a gain error correction factor and a charge decay correction factor for correcting said vibration signal in said processing step as a function of said motoring pressure data.

26. The method of claim 25 wherein said vibration signal is collected in a voltage mode and said method further comprises differentiating said motoring pressure and differentiating said vibration signal, each with respect to engine cycle timing measured in crank angle degrees, and said gain error correction factor is calculated as a ratio between a value for motoring pressure determined from said estimated motoring pressure at a predetermined timing during said engine cycle before the timing for start of combustion; and a value for said vibration signal also at said predetermined timing.

27. The method of claim 25 wherein said vibration signal is collected in a voltage mode and said method further comprises differentiating said motoring pressure and differentiating said vibration signal, each with respect to engine cycle timing measured in crank angle degrees, and said charge decay correction factor is determined by calculating the difference between a peak differentiated motoring pressure and a peak differentiated vibration signal, and determining a characteristic time scale defining charge decay rate, and determining said charge decay correction factor as a function of said characteristic time scale.

28. The method of claim 25 wherein said motoring pressure is calculated based on engine intake manifold pressure sampling assuming a polytropic curve.

29. The method of claim 25 wherein said at least one correction factor is determined by selecting a transfer function from a map of calibrated transfer functions that correct for gain and charge decay errors based on engine intake manifold pressure, engine speed and said vibration signal.

30. The method of claim 25 wherein said vibration signal is collected in a current mode and said method further comprises integrating said vibration signal with respect to the crank angle and determining a gain error correction factor based on a ratio between a value for said motoring pressure determined from said estimated motoring pressure data at a predetermined timing during said engine cycle before the timing for start of combustion; and a value for said integrated vibration signal also at said predetermined timing, and applying said gain error correction factor to said vibration signal when processing said vibration signal in said computer processing unit.

31. The method of claim 25 wherein said vibration signal is collected in a current mode and said method further comprises differentiating said motoring pressure data with respect to engine timing measured in crank angle degrees and said charge decay correction factor is determined from a calculated charge decay error which is determined from a characteristic time scale that defines charge decay rate that is determined as a function of a time difference on a time scale between timing for a peak differentiated motoring pressure and timing for a peak vibration signal in the same engine cycle.

32. The method of claim 24 wherein said vibration signal has a signal-to-noise ratio that is at least 4:1.

33. The method of claim 24 wherein said vibration signal has a signal-to-noise ratio that is at least 6:1.

34. A control system for an internal combustion engine comprising:
(a) a vibration sensor mounted on an engine component outside of a combustion chamber where said vibration sensor is operative to generate a vibration signal when combustion occurs within said combustion chamber during an engine cycle, (b) a data acquisition unit that is operative to receive said vibration signal transmitted from said vibration sensor and to correlate it with engine data associated with said engine cycle, being the same engine cycle associated with said vibration signal, said engine data comprising engine intake manifold pressure and parameters characteristic of engine operation comprising at least one of engine speed and timing for top dead center;

(c) a computer processing unit which is operative to receive and process data from said data acquisition unit to estimate an error introduced by vibration signal decay, and apply a correction factor determined as a function of said engine data and said vibration signal to said vibration signal to generate a corrected vibration signal based on said error, which is determined for said engine cycle, and thereby reconstruct in-cylinder pressure data for at least a portion of said engine cycle from said corrected vibration signal; and, (d) a controller that is operative to control engine operation based on said reconstructed in-cylinder pressure data and said parameters characteristic of engine operation.

35. The control system of claim 34 further comprising a resistor electrically connected in parallel to said vibration sensor.

36. The control system of claim 34 wherein said error has a component that is estimated by comparing a modeled motoring pressure curve based on engine intake manifold pressure to said vibration signal.

37. The control system of claim 36 wherein said modeled motoring pressure curve is an estimated polytropic curve based on engine intake manifold pressure sampling.

38. The control system of claim 36 wherein said error has a component that is estimated using a transfer function selected from a map of calibrated transfer functions based on engine intake manifold pressure and engine speed.

39. The control system of claim 34 wherein said engine component to which said vibration sensor is mounted is in a direct force transfer path from said combustion chamber.

40. The control system of claim 34 wherein said engine component to which said vibration sensor is mounted is a bearing cap for an engine crankshaft.

* * * * *